United States Patent [19]

Silverwood

[11] 4,189,979
[45] Feb. 26, 1980

[54] FASTENER FOR SECURING AND SEALING SHEET MATERIAL IN SPACED RELATION TO A SUPPORT

[75] Inventor: Colin Silverwood, Pudsey, England

[73] Assignee: British Screw Company Limited, Leeds, United Kingdom

[21] Appl. No.: 840,528

[22] Filed: Oct. 11, 1977

[30] Foreign Application Priority Data

Oct. 14, 1976 [GB] United Kingdom ............... 42666/76

[51] Int. Cl.² .................... F16B 13/04; F16B 29/00
[52] U.S. Cl. .................................. 85/74; 85/1 JP
[58] Field of Search ............ 85/70, 73, 74, 75, 76, 85/77, 1 JP; 277/166

[56] References Cited

U.S. PATENT DOCUMENTS

| 784,845 | 3/1905 | Evans ............................................. 85/73 |
| 2,014,451 | 9/1935 | Pfeifer ................................... 85/1 JP |
| 2,203,178 | 6/1940 | Peirle ............................................ 85/70 |
| 2,277,885 | 3/1942 | Rodanet ............................... 85/1 JP |
| 2,385,126 | 9/1945 | Benton ......................................... 85/73 |
| 3,503,584 | 3/1970 | Erhart et al. .............................. 85/36 |
| 3,578,506 | 5/1971 | Chassoux ........................... 277/166 X |
| 3,739,684 | 6/1973 | Vitkevich ................................. 85/73 |
| 3,889,569 | 6/1975 | Fanciullo .............................. 85/1 JP |

FOREIGN PATENT DOCUMENTS

| 1109880 | 10/1955 | France ......................................... 85/73 |
| 1560445 | 2/1969 | France ......................................... 85/75 |

*Primary Examiner*—Rodney H. Bonck
*Attorney, Agent, or Firm*—Parmelee, Miller, Welsh & Kratz

[57] ABSTRACT

A fastener assembly including a screw threaded fastener which has a rigid expander positioned around its shank below the head. A resilient washer having an outwardly directed flange is then provided on the fastener shank and the assembly is completed by a rigid spacer. In use, the fastener is applied to secure a roofing sheet for example to a purlin with the spacer supporting the sheet away from the purlin so as to accommodate relatively soft insulation material disposed between. The expander is forced into the sealing washer during tightening of the fastener to form a water tight seal.

5 Claims, 5 Drawing Figures

FASTENER FOR SECURING AND SEALING SHEET MATERIAL IN SPACED RELATION TO A SUPPORT

BACKGROUND OF THE INVENTION

This invention relates to fasteners.

The invention has particularly been devised for use where it is intended to secure a roofing or cladding panel to a purlin or stanchion, with a layer of insulation between the two. It is desirable that the insulation material should not be crushed or compressed excessively and hence the fastener required to secure the panel in position must be capable of supporting the panel at a position spaced from the purlin or other structural member to which it is to be secured, as well as performing the actual securing operation.

A previously proposed type of fastener has comprised a self-tapping screw having an enlarged head, a resilient annular washer disposed beneath the head and being too large to pass through the hole provided in the panel, a rigid expander disposed below the washer and being of annular shape with an inwardly tapering lower end, and a rigid support sleeve having a slightly flared upper end, co-operable with the taper on the expander. The arrangement was such that the screw head and resilient washer remained on the outer side of the panel whilst the sleeve and the expander passed through the hole in the panel. As the self-tapping screw was screwed into the structural member, the spacer sleeve was trapped above the structural member and forced against the expander so that the flared upper end of the sleeve was forced up the taper and expanded further. Eventually, when the fastener was fully tightened, the flared end of the spacer sleeve was sufficiently enlarged to be pressed against the underside of the panel while the resilient sealing washer was firmly pressed against the upper side, sealing the aperture in the panel.

This previously known fastener had a disadvantage that it was possible accidentally to start expanding the upper end of the sleeve whilst the flared portion was above, rather than below, the level of the panel. In this case, the panel would not be properly supported and might not even be properly secured to the structural member underneath. Furthermore, the seal between the resilient washer and the panel was wholly dependent on there being sufficient pressure exerted by the head to hold the underface of the washer against the upper face of the panel in sealing engagement.

SUMMARY OF THE INVENTION

It is an object of the invention to provide a new or improved fastener assembly which overcomes or reduces the above mentioned difficulties.

According to the invention there is provided a fastener assembly comprising a fastener having a head and a shank including a free end portion remote from the head, said fastener being screw threaded at least at said free end portion; a rigid annular expander disposed surrounding the shank beneath the head and having lead-in means facing said free end of the shank; a resilient sealing washer disposed surrounding the shank between the expander and said free end portion and adapted to be expanded by said expander, said washer comprising a body and a flange projecting outwardly therefrom; and rigid spacer means adapted to abut the end of the sealing washer remote from the fastener head.

Clearly, the sizes of the fastener components are chosen to correspond with the sizes of apertures in the panel and in the structural member to which it is to be secured, and also to correspond with the thickness of the insulation material to be secured between the structural member and the panel.

The lead-in means of the expander may comprise a taper and the sealing washer may be provided with a counterbore to receive the taper in use to enable it to be expanded outwardly.

The flange of the sealing washer may be at the end of the washer remote from the free end of the fastener shank in use.

The spacer means may comprise one or more rigid sleeves surrounding the shank which may have formations such as ribs, projections or an internal screw thread, to provide frictional engagement between the spacer means and the shank.

The spacer means may have a counterbore at the end closest to the head of the fastener in use and may itself receive a portion of the expander to be expanded thereby. At this end of the spacer means, there may be provided a plurality of longitudinal open slots to assist in expansion.

BRIEF DESCRIPTION OF THE DRAWINGS

The invention will now be described in more detail by way of example only with reference to the accompanying drawings in which.

DESCRIPTION OF THE PREFERRED EMBODIMENTS

Figure 1:
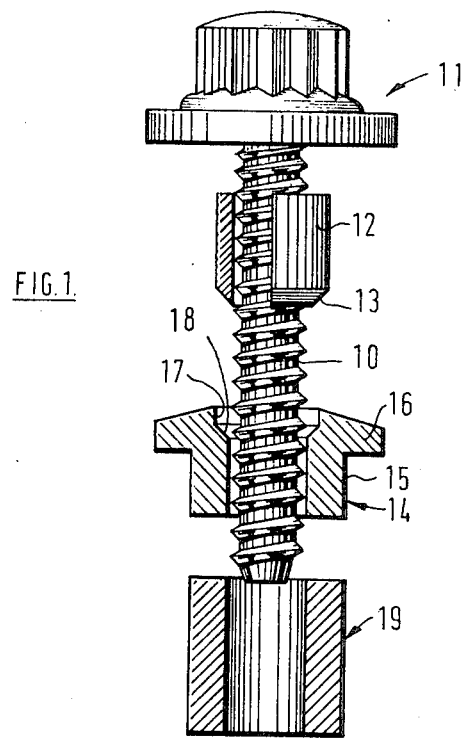
FIG. 1 is an exploded part sectional view of a fastener embodying the invention.

Referring to FIG. 1 of the drawings, the fastener assembly comprises a screw having a threaded shank 10 carrying a self-tapping screw thread and a head 11 having formations engageable by a suitable form of driver to rotate the screw. The fastener assembly further comprises a rigid metal expander 12 which is in the form of a tubular cylindrical part which is a sliding fit on the threaded shank 10. At its lower end the expander has a taper 13.

A flexible resilient sealing washer 14 is also provided which has a cylindrical tubular body 15 and an outwardly directed flange 16 adjacent its upper end. This is again a sliding fit on the fastener shank 10. The sealing washer has a counterbore 17 which, at its inner end, is of inwardly converging generally conical form as shown at 18. The counterbore 17 is capable of receiving the lower end of the expander 12.

The fastener assembly is completed by a spacer 19 which is a sleeve of rigid metal or plastics material and which is a friction fit on the screw threaded shank 10.

Figure 2:
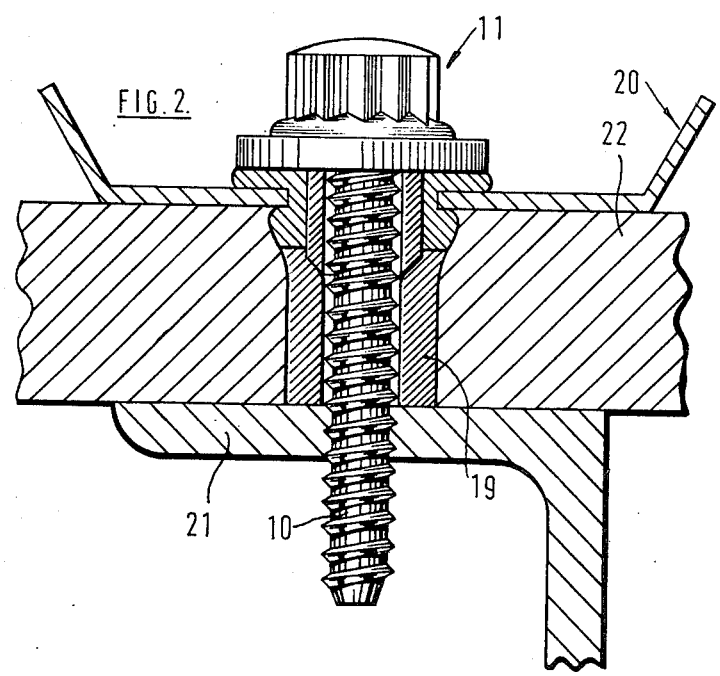
FIG. 2 is a part sectional view of the fastener in use.

The fastener is shown in use in FIG. 2. The fastener is being used to secure a panel 20 which may be a roofing sheet to a structural member 21 which may be a purlin, with an intermediate layer 22 of insulation between panel 20 and the structural member 21.

The fastener assembly is inserted from the outer side of the panel until the tip of the screw threaded shank 10 engages the pre-drilled aperture in the structural member 21. Rotation of the fastener causes the self-tapping thread to engage with the aperture and to draw the head of the fastener downwardly. When the spacer 19 abuts the structural member 21, a compressional force is generated and this urges the resilient sealing washer 15 upwardly against the expander 12. The taper 13 is forced down the taper 18 of the counterbore 17 and tends to expand the upper end of the washer.

It will be appreciated that the flange 16 is normally too large to pass through the hole provided in the panel 20 and so the sealing washer locates with its flange 16 above the panel 20 and with its cylindrical part 15 projecting through the panel 20. The expander is forced downwardly into the sealing washer and expands it downwardly into very firm sealing engagement with the panel 20, completely surrounding the aperture so as to provide a thorough seal against moisture.

As the fastener is completely tightened the spacer 19 abuts the underside of the washer 15 and the expander. If the spacer sleeve 19 is made of a synthetic plastics material, the expander may be capable of distorting the upper end of the spacer somewhat. However, this is an optional feature of the fastener assembly embodying the invention.

Obviously, the sizes of the components of the fastener are chosen so as to be compatible with the sizes of the opening in the panel 20, the opening in the structural member 21 and the thickness of the insulating or other material 22. The opening in the panel 20 is rather larger than would be required for the passage of the threaded shank 10 alone, since this opening needs to receive the cylindrical part 15 of the resilient washer to form a seal with the opening. The spacer may be slightly shorter than the thickness of the insulation 22 so as to accommodate the axial length of the resilient washer 15 in its compressed state as shown in FIG. 2.

Figure 3:
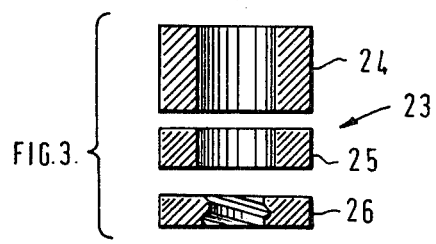
FIG. 3 is a longitudinal sectional view of a set of sleeves used as a spacer means.

FIG. 3 shows a spacer means generally indicated at 23 and comprising a pair of plain sleeves 24 and 25, of different lengths and an internally screw threaded sleeve 26. The screw threads on the sleeve 26 are complimentary with those of the fastener shank 10 so as to retain the sleeve 26 in position while the fastener is being applied to the assembly to be secured. The thickness of the spacer means can be adjusted by choosing the appropriate numbers and sizes of sleeves, for example 24 and 25, which are slid onto the fastener shank and retained frictionally in place by the threaded sleeve 26.

Figure 4:
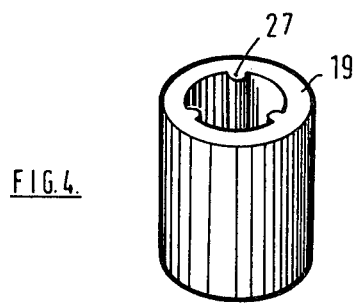
FIG. 4 is a perspective view of a modified spacer means.

FIG. 4 of the drawings shows a modified form of spacer means which comprises a sleeve 19 having a plurality of internal ribs 27 which enable the sleeve 19 to be retained as a friction fit on the fastener shank 10. Alternatively, localised inward projections or the like may be used.

Figure 5:
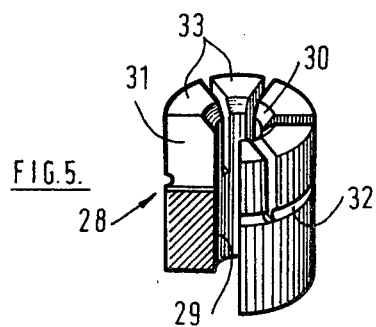
FIG. 5 is a perspective view of a further modified form of spacer means, partly sectioned.

FIG. 5 shows a spacer which is formed as a moulding in a synthetic plastics material. The spacer, generally indicated at 28, includes a central bore 29 which is a friction fit on the fastener shank 10 and which has a generally conical counterbore 30 at the end which is directed uppermost, that is towards the head of the fastener, in use.

Also at this end of the spacer 28 a plurality of longitudinal open ended slots 31 are provided, spaced around the axis of the spacer. A circumferential groove 32 surrounds the spacer at the base of the slots. The overall effect is that the portions between the slots 31 form a plurality of fingers 33 which are deformable outwardly by the expander during final tightening of the fastener assembly, to improve still further the seal between the fastener assembly and the structure which is being secured.

Other modifications and variations of the invention may be used, as will be apparent to those skilled in the art. In particular, the generally cylindrical tubular form of the spacer means and the expander may be varied if desired, and the flange 16 of the sealing washer may in some cases be positioned slightly away from the upper end in use, depending on the head style of the fastener for example.

I claim:

1. A threaded fastener assembly for securing together first and second apertured sheet members in spaced relation, the assembly comprising:
   a threaded fastener having a head and a shank with a free end portion remote from the head, at least the free end portion being screw threaded;
   a rigid expander assembled with the fastener to surround the shank thereof adjacent the head and having an externally tapered lead-in portion at its end remote from the head;
   a resilient sealing washer comprising an annular body and an annular external flange at one end of the body, the sealing washer being assembled with the fastener to surround the shank thereof with the flanged end disposed adjacent the rigid expander;
   a rigid spacer means surrounding the shank of the fastener and abutting the resilient sealing washer at the end thereof remote from the flange;
   the rigid spacer means, the body of the sealing washer and the rigid expander being of such a size as to be capable of passing through the aperture of the first sheet member, the flange of the resilient sealing washer being too large to pass through said aperture, the resilient sealing washer being capable of riding over and being expanded radially outwardly by the rigid expander as the assembly is being secured to said sheets, the resilience of the sealing washer and the dimensions of the sealing washer and expander being so selected in relation to the size of aperture in the first sheet member as to permit the expander to move to a position within the body of the resilient sealing washer and extending through said aperture, whereby the resilient sealing washer is expanded into abutment with both faces of the first sheet member.

2. A threaded fastener assembly according to claim 1 wherein the screw thread on the fastener shank is of a self-tapping or thread forming type and the rigid spacer means is also of a size capable of passing through the aperture of the first sheet member but not of the aperture of the second sheet member, whereby the assembly constitutes a blind side fastener assembly.

3. A fastener assembly according to claim 1 wherein the sealing washer is provided with a counterbore at the end adjacent the expander in use whereby the expander can enter the washer to expand it outwardly.

4. A fastener assembly according to claim 1 wherein the spacer means comprise one or more rigid sleeves surrounding the shank.

5. A fastener assembly according to claim 1 wherein the spacer means is provided with a plurality of projections adapted to have frictional engagement with the shank of the fastener.

* * * * *